Dec. 22, 1964 H. W. ROBINSON 3,162,512
IMMERSION PLATING WITH NOBLE METALS AND THE PRODUCT THEREOF
Filed March 21, 1961
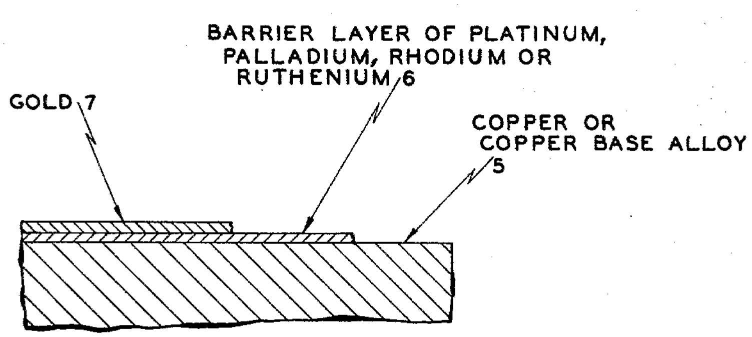
INVENTOR.
HAROLD W. ROBINSON
BY Roger J. Drew
ATTORNEY United States Patent Office 3,162,512
Patented Dec. 22, 1964

3,162,512

IMMERSION PLATING WITH NOBLE METALS AND THE PRODUCT THEREOF

Harold W. Robinson, Union, N.J., assignor to Engelhard Industries, Inc., Newark, N.J., a corporation of Delaware Filed Mar. 21, 1961, Ser. No. 97,172
8 Claims. (Cl. 29—199)

This invention relates to immersion plating with noble metals and, more particularly, to the immersion plating of metals such as copper and copper base alloys, with platinum, rhodium,, palladium or ruthenium over which a thin layer of gold is plated as a second layer.

Practical industrial experience obtained from the use of immersion-plated gold films of the type disclosed in copending application Serial No. 653,286, filed April 17, 1957, and now abandoned, has indicated that gold deposits of a thickness of 0–3 microinches are quite useful in prolonging shelf life and providing solderability for copper printed circuits. In order to obtain good immersion gold deposits directly over copper, it is necessary to mechanically clean the copper by scrubbing with pumice or some other abrasive. This need for mechanical cleaning has not presented any problems since it is required in order to remove residues such as resist and adhesives from the copper circuit, regardless of whether the circuit is to be gold plated.

There is a need for a means of applying immersion plated gold films to copper and brass items which are of such configuration as to preclude the possibility of mechanical cleaning, and also to provide printed circuits with a higher corrosion-resistant surface and even better solderability. The present invention solves these problems.

The use of an intermediate precious metal layer between a copper printed circuit and a gold film immersion plated thereon provides a diffusion barrier between the copper base and the gold, thereby providing better corrosion resistance. The intermediate precious metal film, such as pallidium for example, also acts as a diffusion barrier during soldering to prevent rapid diffusion of the gold into the copper. Gold plating over an intermediate precious metal layer, such as palladium, also provides cleaner and stronger soldered joints than does gold alone. Thin films of rhodium, ruthenium, palladium or platinum, plated directly over copper or copper base alloys, provide an excellent base for gold films deposited from gold immersion plating baths of the type described in the copending application above-identified. There are several methods of producing the immersion precious metal deposits and the most satisfactory are replacement reactions from chlorides and bromides of the precious metals and, in the case of palladium, palladium sulfamate. Other salts may be used, but they are not as satisfactory.

The accompanying drawing is an enlarged cross-sectional view of an electrically conductive circuit portion of a printed circuit and prepared by the present invention.

In the drawing, base layer 5 of copper or a copper base alloy has first layer 6 thereon of either platinum, palladium, rhodium or ruthenium. A layer 7 of gold is on the first layer 6 as a seond layer. The layer 6 serves as a diffusion barrier between the base layer 5 of copper and the layer 7 of gold with the attendant advantages discussed above.

There is no essential difference between the various precious metals when used as an intermediate layer but, on the basis of economic considerations, palladium is the most practical intermediate deposit.

Palladium sulfamate solution has a number of advantages over a halogen-type bath, for example it (1) Operates at room temperature down to the exhaustion point of the palladium,
(2) Provides a slow controlled deposit rate,
(3) Operates at a pH of 2.
(4) Requires no after treatment other than a water rinse,
(5) Does not leave corrosive byproducts in the deposit,
(6) Provides a bright and very adherent palladium film on which gold is readily deposited by immersion,
(7) Provides a process for still or barrel plating, and
(8) The concentration range for either the palladium or sulfamic acid is not critical.

A typical palladium plating solution for plating over copper or copper base alloys may contain 10 grams of palladium metal per liter of water, together with 25 grams of free sulfamic acid per liter. The palladium-sulfamic acid bath may be prepared by dissolving freshly precipitated palladium hydroxide in sulfamic acid at a temperature of 50° C. This temperature should not be exceeded since, above this temperature, insoluble compounds are formed which result in a poor yield. The most practical solution consists of 10 grams of palladium as sulfamate plus an excess of 25 ml. of sulfamic acid per liter of water. Such a solution produces a bright adherent palladium deposit, at a temperature of 25° C. within 15 seconds. The deposit gradually increases until a thickness of 0.00002" is obtained within 70 minutes. Heavier deposits do not appear practical because of surface roughness. However, deposits up to 0.00002" in thickness appear equal to electroplate in adherence, appearance and porosity and, after sealing the palladium with an immersion-plated gold film, the surface is more resistant to corrosion than is palladium alone.

Generally, the plating time for depositing the intermediate precious metal films is between 30 seconds to 3 hours, preferably 5 minutes to 2 hours, and the concentrations of precious metal in the plating solution may be within the range of 0.05 to 50 grams of metal per liter of solution, preferably 1 to 10 grams per liter. The plating temperature may be in the range of about 15 to 100° C., preferably 20 to 35° C.

More specifically, a copper base alloy may be cleaned either by scrubbing or by the use of an ammonium persulfate or by using a standard acid bright dip. The item is washed in clear, cold running water, and immersed in a palladium plating solution, the immersion time being determined by the thickness of plating desired. For practical purposes in printed circuit work, an immersion time of five minutes is satisfactory at a temperature of 25° C. An item so treated will have a bright adherent film of palladium thereon; it is then washed in running water and immersed in a hot immersion gold plating solution at a temperature of 80–90° C., for five minutes. The immersion gold plating solution has the following composition:

| | Gms. |
|---|---|
| $KAu(CN)_2$ | 5 |
| Ammonium citrate | 20 |
| Ethylenedinitrilo tetraacetic acid | 25 |
| Water, 1 liter. | |

pH 4–12, preferably 8–11 by addition of $NH_4OH$.

This treatment produces a palladium film 2 microinches in thickness, covered with a gold film 3 microinches in thickness, thus giving a total film thickness of 5 microinches. Such a combination of films provides much better corrosion resistance, seals the surface, and protects the base metal better than the equivalent of 5 microinches of pure gold.

Platinum, palladium and rhodium bromides may also be used, and these compounds provide deposits from solutions containing as little as 0.05 gram per liter of metal. The hydrobromic acid content may vary widely, however enough must be present to prevent hydrolysis of the precious metal salt. A range of 0.5 to 20 percent free hydrobromic acid provides useful deposits.

Ruthenium requires a minimum of 0.1 gram of ruthenium per liter, and 1 percent free hydrobromic acid to yield satisfactory deposits. The plating temperature, using the bromides, may range from about 20° C. to 100° C., with ruthenium requiring the higher temperatures.

Almost any concentration of hydrobromic acid and metal content may be used if the immersion time is adjusted to compensate for the other variables.

Chlorides of palladium, ruthenium, platinum and rhodium may also be used but, in this case, 20 percent of free hydrochloric acid should be present. The chlorides work well at room temperature.

Sulfide tests show that palladium films produced from the halogen-type baths are more porous than those from the sulfamate.

The invention will be further illustrated by reference to the following specific examples:

*Example I*

A copper printed circuit was cleaned by scrubbing with wet pumice powder and was then rinsed in cold running water and immersed in a palladium sulfamate solution containing 25 grams of sulfamic acid and 10 grams of palladium metal per liter. The circuit immediately became coated wtih a bright adherent deposit of metallic palladium. After immersion for five minutes at room temperature, the copper printed circuit was removed to a running water rinse and placed in a hot (90° C.) immersion gold plating solution of the following composition:

| | Gms. |
|---|---|
| $KAu(CN)_2$ | 5 |
| Ammonium citrate | 20 |
| Ethylenedinitrilo tetraacetic acid | 25 |
| Water, 1 liter. | |
| $NH_4OH$, to adjust pH to 10. | |

The immersion gold plating solution deposited a bright adherent surface which, upon analysis, indicated a gold deposit of 3 microinches over 2 microinches of palladium.

*Example II*

A copper printed circuit was degreased and chemically cleaned in a 10 percent solution of ammonium persulfate, rinsed in cold running water, and immersed in a palladium sulfamate solution containing 25 grams of sulfamic acid and 10 grams of palladium metal per liter. The circuit immediately became coated with a bright adherent deposit of metallic palladium. After immersion for five minutes at room temperature, the copper printed circuit was removed to a running water rinse and placed in a hot (90° C.) immersion gold plating solution of the following composition:

| | Gms. |
|---|---|
| $KAu(CN)_2$ | 5 |
| Ammonium citrate | 20 |
| Ethylenedinitrilo tetraacetic acid | 25 |
| Water, 1 liter. | |
| $NH_4OH$, to adjust pH to 10. | |

The immersion gold plating solution deposited a bright adherent surface which, upon analysis, indicated a gold deposit of 3 microinches over 2 microinches of palladium.

*Example III*

A printed circuit was scrubbed with wet pumice powder and immersed in a solution of palladium bromide containing 10 grams of palladium, as the bromide, and 15 ml. of free hydrobromic acid. The bath was operated at a temperature of 50° C., for a period of three minutes. This treatment deposited a palladium film having a dark overcast, the overcast being removed by immersion in hydrochloric acid. The circuit was washed in running water and immersed in an immersion gold plating solution, of the same composition as that given in Example I above, for five minutes at a temperature of 90° C. This treatment produced a gold film over the palladium very similar to the film deposited from the sulfamate bath of Example I.

*Example IV*

A strip of copper 3" x 3" x 0.01" was cleaned by scrubbing with wet pumice powder. After cleaning, the strip was rinsed with cold water and immediately immersed in a solution containing 3 grams of platinum, as the bromide, in one liter of 2 percent hydrobromic acid. The immersion time was 1.5 minutes at a temperature of 85° C. Upon removal from this solution, the copper exhibited a bright gray coating of platinum metal. Immersion of the platinum-coated copper strip in an immersion gold plating solution, as described in Example I above, resulted in a film of gold being deposited over the platinum.

*Example V*

A strip of copper 3" x 3" x 0.01" was cleaned by scrubbing with wet pumice powder. After cleaning, the strip was rinsed in cold water and immediately immersed in a solution containing 3 grams of ruthenium, as the bromide, in 1 liter of 2 percent hydrobromic acid. The immersion time was five minutes, at a temperature of 100° C. Upon removal from this solution, the strip exhibited a bright gray coating of ruthenium metal, and immersion of the ruthenium-coated copper strip in an immersion gold plating solution, as described in Example I above, resulted in a film of gold being deposited over the ruthenium.

*Example VI*

A strip of copper 3" x 3" x 0.01" was cleaned by scrubbing with wet pumice powder. After cleaning, the strip was rinsed in cold water and immersed in a solution containing 3 grams of rhodium, as the bromide, in 1 liter of 2 percent hydrobromic acid. The immersion time was one minute, at a temperature of 25° C. Upon removal of the strip from the solution, the copper exhibited a bright gray coating of rhodium metal, and immersion of the rhodium-coated copper strip in an immersion gold plating solution, as described in Example I above, resulted in a film of gold being deposited over the rhodium.

It will be obvious to those skilled in the art that many modifications may be made within the scope of the present invention without departing from the spirit thereof, and the invention includes all such modifications.

What is claimed is:

1. In a printed circuit, a composite electrically-conductive circuit portion consisting of a base metal selected from the group consisting of copper and copper base alloys having a first layer thereon of a metal selected from the group consisting of platinum, rhodium, palladium and ruthenium, and a layer of gold on the first layer as a second layer.

2. A process for forming a bi-metal deposit on a base metal article comprising non-electrolytically immersion plating a thin first layer of a metal selected from the group consisting of platinum, rhodium, palladium, and ruthenium on the surface of the base metal article and non-electrolytically immersion plating a thin layer of gold on the surface of said first layer as a second layer.

3. A process according to claim 2 in which a plating solution of a chloride of the metal is utilized for the first layer immersion plating.

4. A process according to claim 2 in which a plating solution of a bromide of the metal is utilized for the first layer immersion plating.

5. A process according to claim 2 in which a plating solution of palladium sulfamate is utilized for the first layer immersion plating.

6. A process according to claim 2 in which the base metal is selected from the group consisting of copper and copper base alloys.

7. A process for forming a bi-metal deposit on an article of a base metal selected from the group consisting of copper and copper base alloys comprising non-electrolytically immersion plating a thin first layer of a metal selected from the group consisting of platinum, rhodium, palladium, and ruthenium on the surface of the base metal article and non-electrolytically immersion plating a thin layer of gold on the surface of said first layer as a second layer.

8. A process for forming a bi-metal deposit on an article of a base metal comprising non-electrolytically immersion plating, from a palladium sulfamate plating bath, a thin first layer of palladium on the surface of the base metal article and non-electrolytically immersion plating a thin layer of gold on the surface of said first layer as a second layer.

References Cited in the file of this patent

UNITED STATES PATENTS

| | | |
|---|---|---|
| 1,207,218 | Roux | Dec. 5, 1916 |
| 1,904,241 | Kammerer | Apr. 18, 1933 |
| 2,532,283 | Brenner | Dec. 5, 1950 |
| 2,600,175 | Volterra | June 10, 1952 |
| 2,690,402 | Crehan | Sept. 28, 1954 |
| 2,897,584 | Schumpelt | Aug. 4, 1959 |
| 2,973,283 | Hill | Feb. 28, 1961 |
| 2,976,181 | Brookshire | Mar. 21, 1961 |

OTHER REFERENCES

Piontelli et al.: La Chimica e l'Industria (Italy), vol. 21, pages 478–491 (1939).